United States Patent
Kaeli et al.

(10) Patent No.: US 11,990,857 B2
(45) Date of Patent: May 21, 2024

(54) ROTATIONAL FEEDBACK CONTROL SYSTEM AND METHOD

(71) Applicant: WOODS HOLE OCEANOGRAPHIC INSTITUTION, Woods Hole, MA (US)

(72) Inventors: Jeffrey Kaeli, Woods Hole, MA (US); Frederic Jaffre, Woods Hole, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 362 days.

(21) Appl. No.: 17/612,944

(22) PCT Filed: May 27, 2020

(86) PCT No.: PCT/US2020/034620
§ 371 (c)(1),
(2) Date: Nov. 19, 2021

(87) PCT Pub. No.: WO2020/243122
PCT Pub. Date: Dec. 3, 2020

(65) Prior Publication Data
US 2022/0329179 A1    Oct. 13, 2022

Related U.S. Application Data

(60) Provisional application No. 62/853,775, filed on May 29, 2019.

(51) Int. Cl.
H02K 11/21    (2016.01)
H02P 6/17     (2016.01)

(52) U.S. Cl.
CPC .................................... *H02P 6/17* (2016.02)

(58) Field of Classification Search
CPC .................................. H02P 6/17; H02P 6/16
See application file for complete search history.

(56) References Cited

U.S. PATENT DOCUMENTS 5,522,434 A     1/1996   Lindblom
10,090,846 B2 * 10/2018  Shimizu ................... H02P 6/16
2019/0004173 A1  1/2019  Moskovchenko et al.

FOREIGN PATENT DOCUMENTS

CN     105814405      7/2016
JP     2018500214     1/2018

* cited by examiner

*Primary Examiner* — Muhammad S Islam
(74) *Attorney, Agent, or Firm* — Kean Miller LLP; Robert Devin Ricci; Lauren J. Rucinski (57) ABSTRACT

A rotational feedback control system, and method of using same, including a rotating element, a sensor and a digital controller. The system capable of monitoring, setting, and adjusting the inter-rotational angular velocity within a single revolution of the rotating element. The digital controller implementing a control system with control parameters based on angular position, nominal angular velocity and steering angular velocity.

20 Claims, 8 Drawing Sheets

| Sector | PWM | VMA | diff | adj |
|---|---|---|---|---|
| 201a | 0 | 0 | 0 | 6 |
| 201b | 6 | 6 | 0 | 25 |
| 201c | 25 | 20 | 5 | 50 |
| 201d | 50 | 40 | 10 | 75 |
| 201e | 75 | 65 | 10 | 93 |
| 201f | 93 | 85 | 8 | 100 |
| 201g | 100 | 91 | -9 | 93 |
| 201h | 93 | 100 | -7 | 75 |
| 201i | 75 | 82 | -7 | 50 |
| 201j | 50 | 58 | -3.5 | 25 |
| 201k | 25 | 28 | -3 | 6 |
| 201l | 6 | 6 | 0 | 0 |

ROTATIONAL FEEDBACK CONTROL SYSTEM AND METHOD

CROSS-REFERENCE TO RELATED APPLICATIONS

This application is a 35 USC § 371 National Stage application of International Application No. PCT/US2020/034620 filed May 27, 2020, now pending; which claims the benefit under 35 USC § 119(e) to U.S. Application Ser. No. 62/853,775 filed May 29, 2019. The disclosure of each of the prior applications is considered part of and is incorporated by reference in the disclosure of this application.

FIELD OF THE INVENTION

This invention relates to the control of a rotating element. More specifically this invention relates to controlling the instantaneous speed of a rotating element within a single revolution of said rotation. In some cases, it relates to controlling the speed or period of rotation within a single rotation repeatedly over many rotations to affect a change in behaviour of the system.

BACKGROUND OF THE INVENTION

Motors, fans, mixers and many other systems rely on a rotating drive shaft or other rotating component for operation. Traditionally, the drive shaft is rotated at a constant angular velocity within a single rotation. However, newer applications have been developed that could utilize variable rotation velocity within a single rotation. One such application is described in more detail in U.S. Pat. No. 9,873,499, where an asymmetric propeller is rotated with variable angular velocity within a single rotation repeatedly over a series of rotations to affect a directional thrust of the attached device.

Other rotational-based applications could be enabled with variable angular velocity if accurate and precise control of the angular velocity could be achieved. Applications include reagent stirring, liquid or air manipulation (e.g. directional fans, blenders, or washing machines), adaptive rotation of control surfaces (e.g. automobile wheels and tires), and the like.

The rotational or angular velocity ω (omega) of a rotating element is defined in Equation #1, as the rate of change Δt of an angular rotation Δθ of angle θ (theta). The larger the angle θ in a given amount of time, the larger the angular velocity, which has units of radians per second (rad/s).

$$\omega = \Delta\theta/\Delta t \qquad \text{Eq. \#1}$$

Angular acceleration α (alpha) is expressed in Equation #2 and is the rate of change of angular velocity Δω over time Δt, having units of radians per second squared (rad/s²).

$$\alpha = \Delta\omega/\Delta t \qquad \text{Eq. \#2}$$

Typical situations where angular acceleration is not constant include a motor starting up or stopping, a hard disk shutting down, or an ice-skater pulling in their out-flung arms while spinning. However, these situations have angular acceleration in one direction (i.e. positive, speeding up, or negative, slowing down) across more than one rotation, where angular acceleration increases or decreases throughout the entire rotation and does not oscillate within a given rotation.

It is therefore desirable to enable systems to change angular movement within a single rotation, and to do so in a repeatable and controllable fashion. The rotational control feedback invention described herein advances the control of angular velocity within a single rotation of a rotating element for the purpose of enabling novel applications.

SUMMARY

An object of the present invention is to provide control of a rotating element for a plurality of velocities within a single revolution of the rotating element. This invention features a control system to receive, from a sensor, the rotational information of a rotating object. The rotational information, or actual velocities, are compared by a digital controller to a plurality of instructed velocities that the controller set for the rotational element to conduct a behavior. Due to invariable uncertainties of mechanical systems, the actual velocities within a single revolution performed by the rotating element will differ from the desired, instructed velocities. Therefore, the controller is programmed to compare the pluralities of instructed velocities to the plurality of actual velocities, determine the differences for each of the plurality of velocities and calculate the best compensation velocities to correct the differences. The compensation velocities then seek to have the rotational element perform closer to the desired, original instructed velocities on additional rotations of the rotational element.

Additionally, the inventive system describes a system having a rotating element configured to rotate about an axis, a controller, and a sensor connected to the controller. The sensor is configured to sense the angular position of the rotating element and sends the angular position information to the interconnected controller. The controller is configured to adjust the angular velocity of the rotating element within a single revolution of the rotating element. In many embodiments, the controller adjusts the rotating element's angular velocity based, in part, on the positional information received from the sensor. Some embodiments also comprise a propulsor that is connected to the rotating element, and the propulsor provides the motive force to rotate the rotating element. Furthermore, in some cases the controller controls the angular velocity of the rotating element by adjusting the motive force supplied by the propulsor to the rotating element.

In some cases, the controller uses proportional-integral-derivative controller feedback to adjust angular velocity. The controller may also programmatically divides a single revolution of the rotating element into a plurality of sections; in addition the controller may also stores a plurality of position information received from the sensor as well as calculate an average of the stored information.

In some embodiments, the system further includes as housing that surrounds at least the controller, the housing excludes an external environment, preventing the external environment from impinging on the controller, where the controller is located within the interior of the housing. In some cases, the housing surrounds a portion of the rotating element. In some cases, the housing further surrounds a propulsor. In some cases, the housing has a sealing mechanism (e.g. an o-ring) though which the rotating element protrudes, enabling the external environment to be excluded from the interior of the housing, while enabling the rotating element to be partially outside the housing. In some embodiments, an external control device is informationally connected to the controller, and the external control device is adapted to provide programmatic instructions to the controller. In some cases, the external control device is physically connected to the controller (e.g. a wired connection), in other cases the external control device is wirelessly connected to the controller.

One purpose of this invention is to provide a system for rotational control, the system having a rotating element with an axis of rotation, a controller and a propulsor connected to the rotating element and the propulsor produces a motive force onto the rotating element. The motive force is adapted to rotate the rotating element about its axis of rotation. The controller is also connected to the propulsor and the controller is adapted to change the motive force by calculating at least two control parameters, namely a first and a second control parameter. It is even envisioned that in some embodiments, the first control parameter is steering angular velocity and the second control parameter is angular position. In some cases, a third control parameter is established representing nominal angular velocity. In some additional cases a fourth control parameter is established representing a maximum angular velocity and where the first and third control parameters are not greater than the fourth control parameter.

One purpose of this invention is to provide a system where the third control parameter subtracted from the first control parameter is always greater than zero, meaning in certain embodiments, the rotating element never comes to a complete stop. In some circumstances, the third control parameter subtracted from the absolute value of the first control parameter is always greater than zero. Tt is even envisioned that the control may establish an inter-rotation velocity profile having more than one angular velocity within a single revolution and that the controller instructs the propulsor to perform the inter-rotation velocity profile. In some of these cases, the controller instructs the propulsor to perform the inter-rotation velocity profile repeatedly over a number of rotating element rotations.

In operation, a non-transient computer readable medium contains programming instructions for causing a computer to perform several steps. The steps including setting a plurality of instructed velocities for a rotational element to rotate; instructing the rotational element to rotate at the plurality of instructed velocities; receiving from a sensor, measured actual velocities of the rotational element; computing a plurality of compensation velocities based on said instructed and said actual velocities; and replacing the plurality of instructed velocities with the plurality of compensation velocities. In some embodiments, the method includes the step of establishing a plurality of sections representing a single revolution of the rotating element.

In some embodiments, the method includes the step of calculating the plurality of compensation velocities by computing a difference between said plurality of instructed velocities and said plurality of actual velocities. In other embodiments, the method instead includes the step of calculating the plurality of compensation velocities by moving the instructed velocities to another sector, in some cases, adjacent sectors. In still other embodiments, the method includes the step of calculating the plurality of compensation velocities by applying a proportional-integral-derivative feedback mechanism. In some embodiments, the method includes the step of instructing the rotating element to rotate according to the plurality of replaced instructed velocities. In some embodiments, the method includes the step of rotating said rotational element by a propulsor, the propulsor providing a motive force and the plurality of instructed and compensation velocities are used to apply the motive force onto the rotating element.

The invention, in one embodiment is a computer program product comprising a computer usable medium having computer readable program code means embodied therein for causing a angular velocity feedback control method, the computer readable program code means in said computer program product comprising computer readable program code means for causing a computer to instruct the rotational element to rotate at a plurality of instructed velocities; computer readable program code means for causing a computer to effect the measurement of a plurality of velocities of a rotational element, producing a plurality of actual velocities; computer readable program code means for causing a computer to calculate the difference between said plurality of instructed velocities and said plurality of actual velocities; computer readable program code means for determining a plurality of compensation velocities; and computer readable program code means for causing a computer to instruct the rotational element to rotate at said plurality of instructed velocities.

In another embodiment, the invention is expressed as a program storage device readable by a machine, tangibly embodying a program of instructions executable by the machine to perform method steps for velocity feedback control, the method steps comprising the computer readable program code means described in the preceding paragraph.

In one embodiment, the system

One purpose of this invention is to provide a system the compensation velocities are executed in a plurality of compensation fractions; in some cases, the number of fractions is a frequency related to the velocity of the rotating element. In some situations, the angular velocity is 1000 rpm, and the compensation fraction is 1000 Hz. In some of these situations, the angular velocity increases from 1000 rpm (while the controller executes compensation fractions of 1000 Hz) to 3000 rpm, and the controller increases the number of compensations fractions to a corresponding 3000 rpm.

BRIEF DESCRIPTION OF THE DRAWINGS

In what follows, preferred embodiments of the invention are explained in more detail with reference to the drawings, in which.

DEFINITIONS

The term "rotational controlling system" refers herein to an assembly of components and logic of determining the angular velocity of a rotating element, comparing that velocity with a desired velocity and correcting for any differences. Most often the system controls a differing angular velocity within a single revolution SR.

The term "rotating element" refers herein to an object, typically approximately cylindrical that rotates about a first axis, typically its longitudinal axis. The rotating element is capable of changing its angular velocity or having its angular velocity changed by another component within a single revolution SR.

The term "angular positional information" refers herein to data or information pertaining to which angle a specific point on a rotating element is facing, expressed as $\theta$ (theta) in arc degree units, or alternatively in radians.

The term "angular movement" refers herein to the rotation of an object from one angular position ($\theta_1$) to second ($\theta_2$), typically about that object's longitudinal axis.

For the purpose of this disclosure, the term "acceleration" covers both positive (i.e. faster) and negative (i.e. slower or deceleration) of a rotating object.

For the purpose of this disclosure, the term "revolution" is the complete turn of an object (i.e. the rotating element 102) around a center point or axis (i.e. the axis of rotation AR).

The term "instantaneous angular velocity" refers herein to the angular velocity of a rotating element within a single revolution, at any given angular position.

The term "velocity profile" as used herein refers to a plurality of velocities within a single revolution. For example, an inter-rotation velocity profile refers to a plurality of different angular velocities for a rotating element within a single revolution. A second example is a compensation velocity profile, that refers to a plurality of compensation velocities within a single revolution.

DETAILED DESCRIPTION OF THE PRESENTLY PREFERRED EMBODIMENTS

Overview

A system, method, computer program product, and non-transitory computer readable medium are provided as technical solutions. These provided solutions allow for a control feedback loop of a rotating element having a plurality of different angular velocities, typically within a single revolution. Changing the angular velocity within a single revolution is also referred herein as having a plurality of inter-rotation velocities. And when the plurality of inter-rotation velocities are taken together, as an inter-rotation velocity profile.

This invention may be accomplished by a system 100 and a feedback system 200. The system 100 including a rotating element (also referred herein as a rotator) 102, a sensor 106, and a controller 104. In system 100, the rotator rotates about an axis of rotation AR at an angular velocity $\theta$, the sensor measures the angular position of the rotator, the controller is interconnected to the sensor and rotator, and the controller further controls the rotator's angular velocity $\theta$ to execute desired system behaviors. The feedback system 200, often a computer program product, is executed by the controller 104 and involves a number of steps, depicted in FIG. 2A and including the steps of (a) having a behavior for the system 100 to perform 202, (b) determining a plurality of instructed velocities needed to execute the behavior 204, (c) instructing the rotator to rotate 206 at the plurality of instructed velocities 253, (d) receiving actual velocities readings 208 of the rotator 102 from sensor 106 (as part of this step, the sensor performs its normal task of measuring rotator angular velocities 206'), (d) computing a plurality of differences 257 between instructed and actual velocities 210, (e) determining if the plurality of differences 257 are significant 212. If the differences 257 are significant, performing steps (f) computing a plurality of compensation velocities 259 for the rotator 102 to rotate 214 and (g) instructing the rotator to rotate 216 at the compensation velocities. If the differences 257 are not significant, then performing steps (h) determining if the behavior is completed 218 by the actual velocities, and if so, performing a new behavior 202; if not, repeating the method from step (c) 206. The plurality of velocities described herein are preferably different velocities at different angular positions about the rotator's period of rotation.

Figure 1:
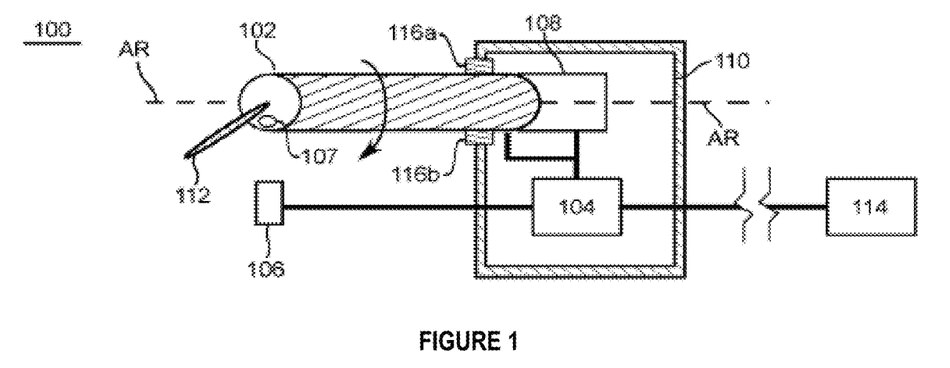
FIG. 1 is a schematic view depicting the disclosed system according to one embodiment.

In one currently preferred embodiment, the system 100 further comprises a propulsor 108 (e.g. a motor), connected to the rotating element 102 and the controller 104. The propulsor 108 is configured to change the angular velocity of the rotating element 102 in response to instructions from the controller. As illustrated in FIG. 1, the currently preferred embodiment comprises system 100, with rotating element 102, controller 104, sensor 106 and propulsor 108, where the controller 104 is typically disposed within a housing 110. In most embodiments, the rotating element 102 is further connected to an actuator mechanism 112. The actuator 112 most often performs the physical output of the system, for example, a propeller which moves the system 100, or a stirring mechanism which stirs a fluid in which the actuator 112 is disposed.

Rotating Element

The present invention provides a rotating element that is capable of rotating about a first axis. Typically, the rotating element 102 will be a cylindrical or near-cylindrical drive shaft that rotates about its longitudinal axis, also referred herein as the axis of rotation AR. The rotating element 102 can be any element known in the art as long as it is capable of rotating about at least one axis, and its rotating speed, expressed as angular velocity, is changeable, preferably within a single revolution SR. In addition, the rotating element 102 is preferably attachable to at least one of a propulsor 108 and an actuator 112. In one currently preferred embodiment, the rotating element 102 is a commonly known drive shaft attached to a motor (i.e. the propulsor 108) and a propeller (i.e. the actuator 112). In a second embodiment, the rotating element 102 is also a commonly known drive shaft attached to a motor and a rotating stirrer.

Angular Position Sensor

The invention further provides at least one angular position sensing mechanism, referred herein as sensor 106 to measure the angular position of at least one of the rotator 102 and the actuator 112. The sensor 106 generates angular positional information for the angular position of the rotator 102 or actuator 112. The sensor is connected to and provides angular positional information to the controller 104, enabling the controller to determine the angular position throughout a single revolution SR of the rotator 102. The sensor 106 may be any suitable sensing mechanism known in the art, provided it enables measurement of the rotator's angular position. These determined angular positions over time are referred herein as the actual velocities, plotted in FIG. 2C as line 255. For the purpose of this disclosure, a single revolution SR is defined as one complete turn of an object (i.e. the rotator) around a center point or axis (i.e. the axis of rotation AR). In one embodiment, the sensor 106 is an component that measures the magnitude of a magnetic field (e.g. a Hall Effect sensor) positioned on or above a rotator 102 drive shaft. The Hall Effect sensor detects a magnetic field disposed most often on an actuator mechanism 112, for example a magnet on a propeller. The Hall Effect sensor outputs a voltage directly proportional to the magnetic field strength that it experiences. The magnetic field increases as a sensor readout (e.g. a magnet) 107 approaches sensor 106. In another embodiment, sensor 106 is a reed sensor, in yet another embodiment sensor 106 is a conductive or optical rotary encoder. In still another embodiment the sensor 106 is another optical or audio-based sensor.

Controller

Figure 2A:
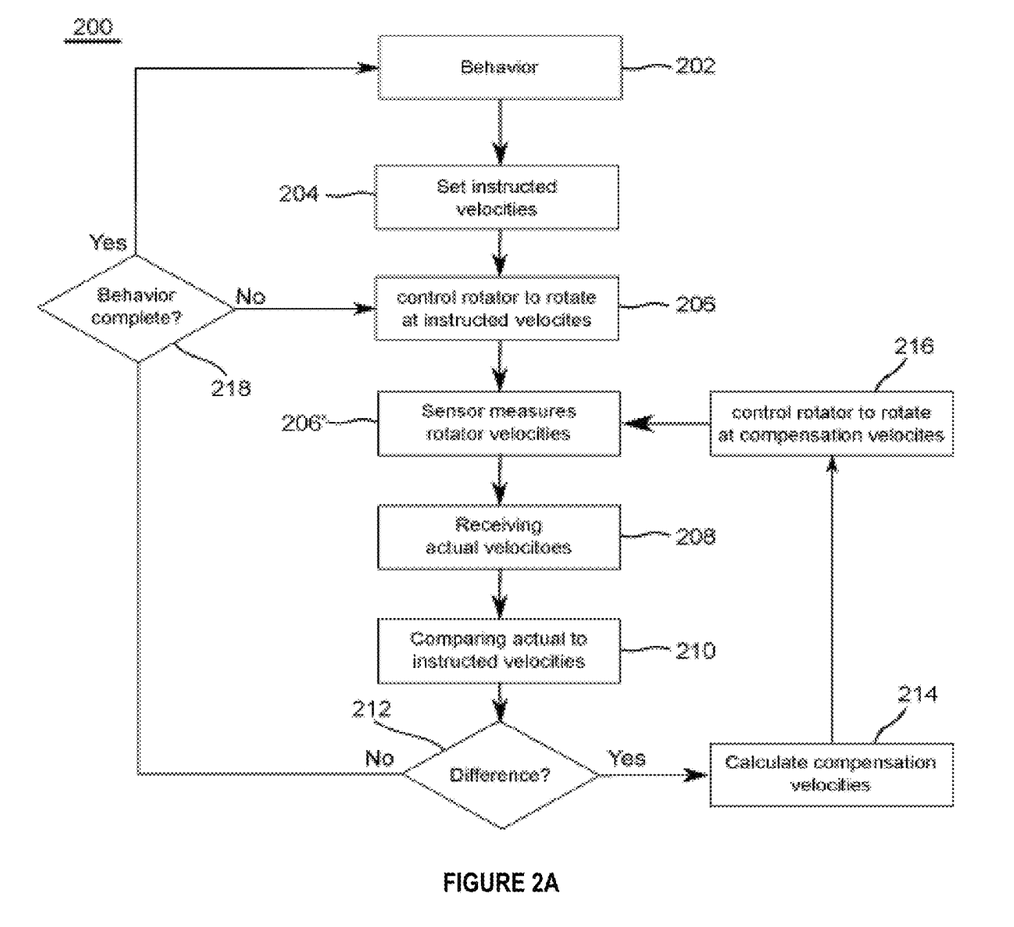
FIG. 2A is a flow diagram of the feedback method according to one embodiment.
Figure 2B:
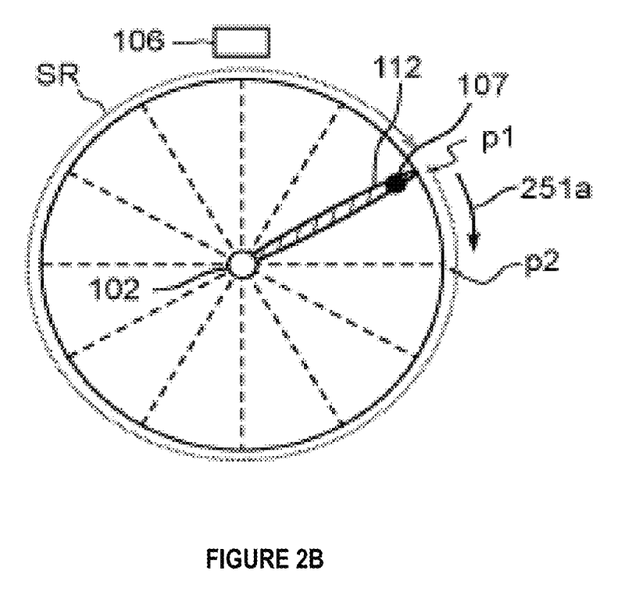
FIG. 2B is an end-on view of one embodiment showing an actuator mechanism attached to a rotating element and a schematic representation of the actuator mechanism's rotational period broken into sections.
Figure 2C:
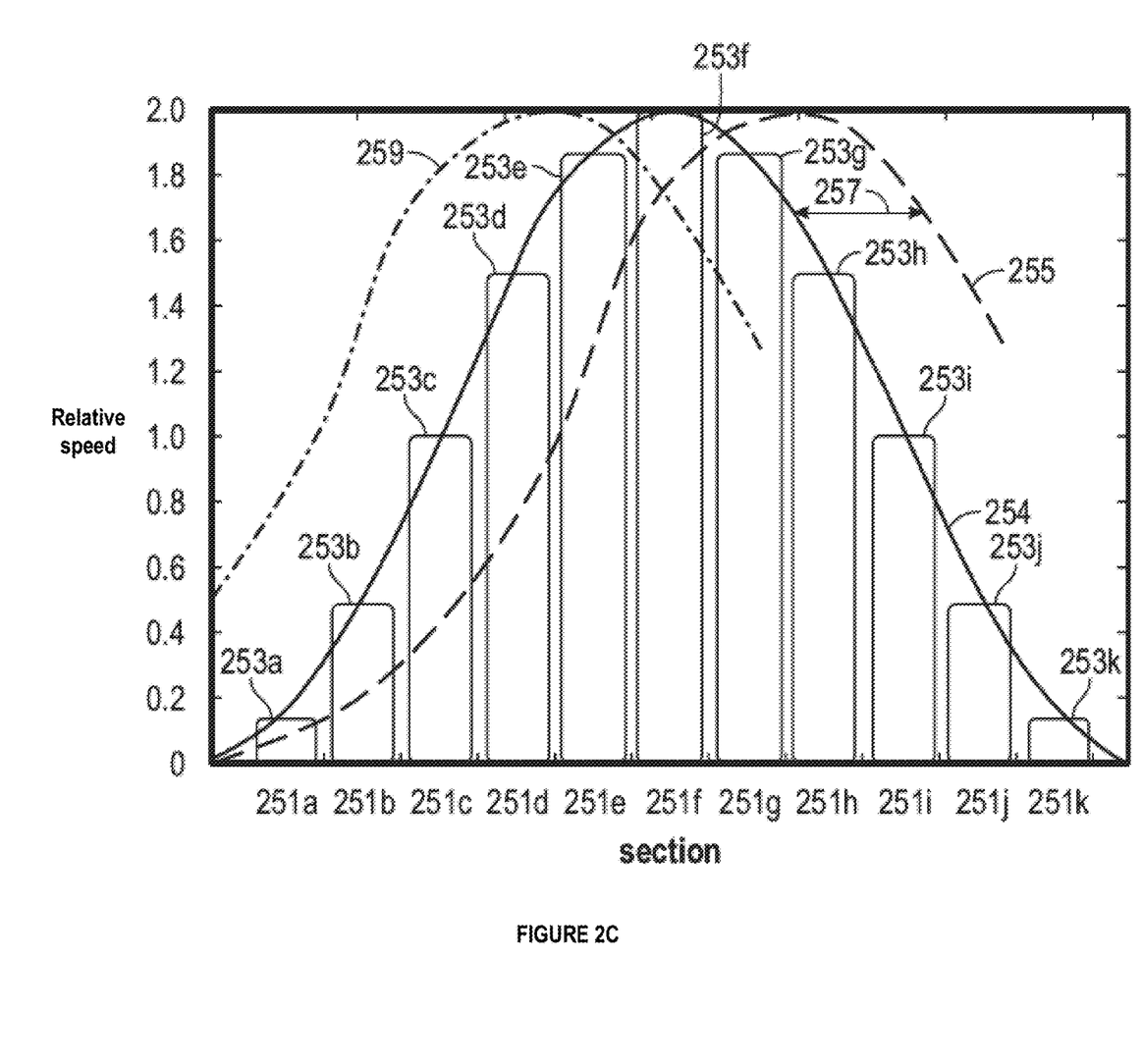
FIGS. 2C and 2D are charted speed profiles of a rotating element of the embodiment shown in FIG. 2B with desired, actual, and compensation speed profiles.

A digital controller 104 is provided to control the angular velocity of the rotating element 102. Control includes setting a plurality of instructed velocities 253 for the rotating element 102 to rotate at, typically each instructed velocity is assigned to a revolution section 251, receiving the actual velocities 255 from sensor 206, determining the difference 257, determining a plurality of compensation velocities 259, and instructing one of the rotating element 102 or the propulsor 108 rotate at the compensation velocities 259, as depicted in FIGS. 2A and 2C. The controller may also be connected to an external control device 114, for receiving new behaviors requiring different instructed velocities 253. The external control device is preferably also a digital controller as described herein, is informationally connected to controller 104, and may exchange (send and receive) data, programmatical control instructions for rotation, behaviors, control parameters, and the like. Examples of external control devices include an autonomous vehicle controller, a joystick, a networked computer, and the like.

The controller 104 is a digital controlling system, configured to send commands and to receive information from suitable components of the system 100, as well as components outside the system (e.g. an external control device 114). The controller enables real-time operational control of the system by receiving sensor data, storing said data, and changing parameters of the interconnected components. The controller 104 is most often connected to the rotator 102 or the propulsor 108 and is configured to control rotating velocities. Furthermore, the controller 104 is configured to receive commands or data from external sources; for example, the external control device 114.

In the currently preferred embodiment, the controller consists of a central processing unit (cpu), random access memory (RAM), long-term memory storage, and optionally, analog to digital converters. In one embodiment the controller comprises a Raspberry Pi computer coupled to an additional analog to digital converter board and long-term memory. In many embodiments, the controller consists of one or more circuit boards, which may include a microcontroller circuit board (commonly referred to as a microcontroller), one or more power management boards, and one or more distribution boards. In some embodiments, all of the circuit boards may be centralized onto one circuit board, referred to as an integrated circuit.

Propulsor

The present invention provides for a propulsion mechanism, referred herein as the propulsor 108 that, in some embodiments, provides a motive force to the rotating element 102. Most often propulsor 108 is a type of motor that drives a rotating element 102, where the rotating element is a drive or driven shaft. The propulsor 108, if included in an embodiment, may be any suitable mechanism commonly known in the art, provided its motive force output is controllable by controller 104.

Actuator

The rotating element 102 typically rotates about its longitudinal axis, with an attached and optional actuator mechanism 112, referred herein as the actuator. The actuator 112 is responsible for performing a useful output. The actuator 112 may be any object, often mechanical, as needed by a specific embodiment. In one embodiment, illustrated in FIG. 4A, actuator mechanism comprises propeller blade 612, moving in the coordinate frame x, y, z and rotating about axis x (where axis x is the axis of rotation AR). Propeller blade 612 has a length 614 from the attachment area 620 to the rotating element depicted in FIG. 4A (the rotating element is not show but the attachment area is depicted as the origin of coordinate frame x, y, z; reference numeral 620). The length 614 may also be thought as a radius from attachment spot 620 to an arbitrary point 616 on propeller 612. Arbitrary point 616 may be established to simplify the derivation of control parameters angular velocity, angular position, and angular steering velocity to moment and force equations. Point 616 may be established to calculate the radius at which the force 618 of propeller 612 acts on the surrounding environment.

Housing

In some embodiments, the inventive system is present is deployed in a hostile, wet or otherwise dangerous environment. In these embodiments, a housing 110 is provided to exclude the external environmental from one or more components of the system. Typically, the controller 104 is located within the interior of the housing. In the currently preferred embodiment, the housing is fluid and gas-tight, the controller 104 and propulsor 108 are surrounded by the housing such that they are excluded from the external environment, and the housing further has a sealing mechanism 116 that enables the rotating element to protrude through the housing 110 from the interior of the housing into the external environment, as illustrated in FIG. 1. Sealing mechanism is shown in cross section in FIG. 1, labelled the two sides of visible sealing mechanism as 116a and 116b. In some embodiments, the external control device 114 is located within the housing; in other embodiments the external control device is located in a different location, or even a different housing. The housing 110 and sealing mechanism 116 may be any suitable solution as known in the art.

Revolution Sections

The present invention splits a single full revolution SR of 360 degrees (i.e. 2n), into multiple sections. The amount or degree of division of a single full revolution SR into sections is arbitrary and it is within the scope of the present invention to break a revolution into any number of sections. One possible division of a revolution is depicted in FIG. 2B where section 251a encompasses the arc between points p0 and p1 and the complete single revolution SR is divided into 12 sections 251a-k. To complete a behavior, controller 104 may establish, or assign, instructed velocities 253a-k for sections 251a-k (i.e. assign one velocity to one section, for all of the sections), plotted as bar graph lines in FIG. 2C. Alternatively, the instructed velocities may be expressed as a function, depicted by solid line 254. A complete single revolution SR is depicted in FIG. 2 B as a grey, circular arrow labelled SR.

Figure 4A:
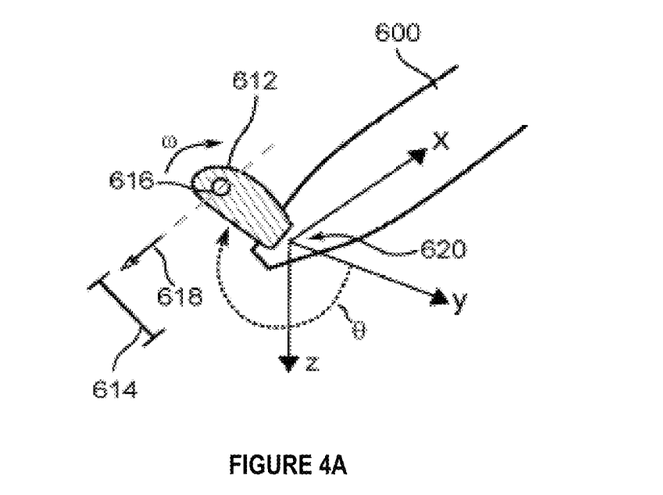
FIG. 4A is a schematic view of one embodiment illustrating the x, y and z coordinate frame with angular velocity and angular position of the rotating element and attached actuator.
Figure 4B:
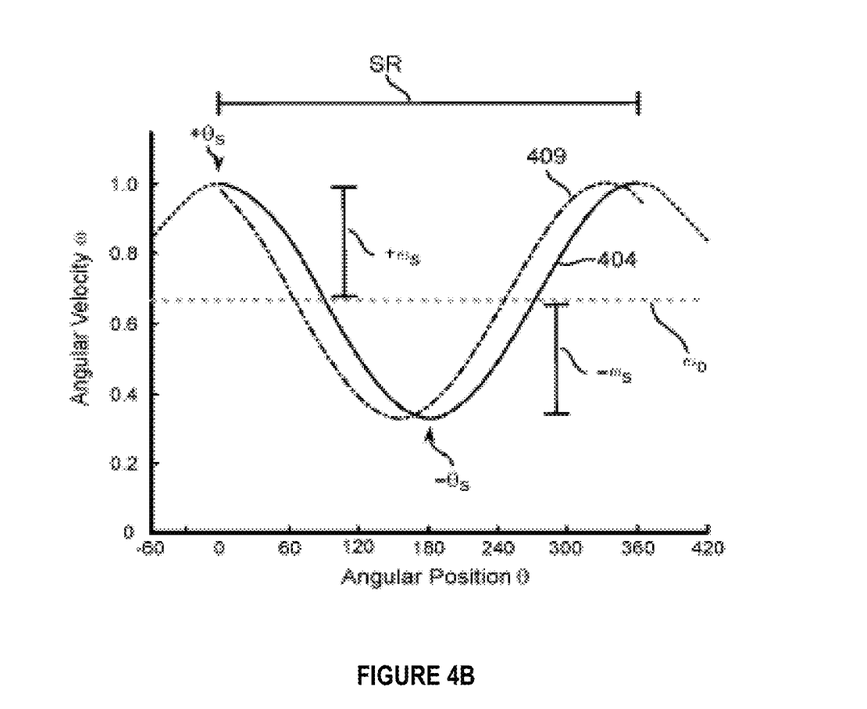
FIGS. 4B and 4C are Cartesian and polar plots, respectively, of one possible angular velocity profile of the embodiment illustrated in FIG. 4A.
Figure 4C:
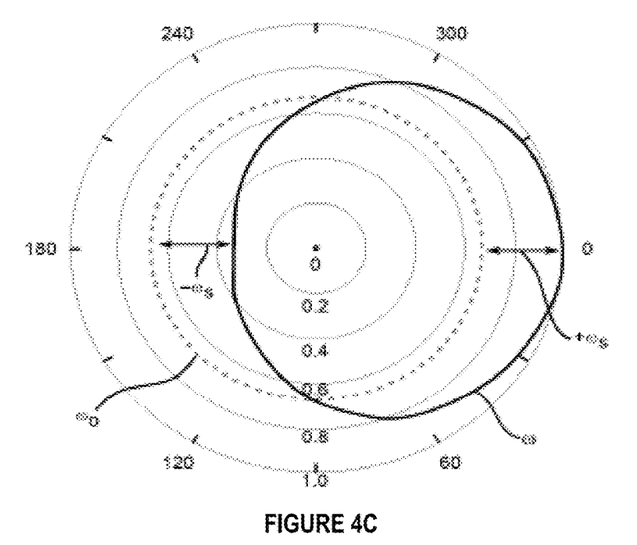

Depending on the embodiment, a revolution may be broken up into 36, 64, 360, 3600 (1/10 degree), or any other number. As a second example, the embodiment shown in FIGS. 4B and 4C is divided into 360 sections, each section corresponding to a single arc degree (or 0.0174 radian).

Feedback System

The monitoring and correction of rotational element velocities are referred herein as the feedback control system 200. The feedback control system 200 is encoded or otherwise programmed into the digital controller 104. In one embodiment, the feedback system 200 is stored as information on a computer readable medium (abbreviated CRM). The CRM is most often non-transitory, that is the information is not encoded on transitory signals. The CRM may be encoded onto a physical piece of memory, for example a CD-rom, a flash drive, a single board computer, and the like, as long as it is substantially permanent that the programmed steps may be carried out on an applicable system 100.

The feedback system 200 provides programming enabling the controller to receive and optionally record movement data over time, by means of sensor 106. Most often a single, full revolution SR is broken into multiple sections 251, and the sensor 106 reports the angular velocity of the rotator 102 to the controller 104 for each section.

Sections from one embodiment are depicted in FIG. 2B, where a single revolution SR is broken into sections 251a-k. Each section is assigned an instructed velocity 253a-k by controller, illustrated in FIGS. 2C and 2D. Sensor 106 measures and sends information pertaining to the actual velocities 255 to the controller 104. The controller preferably has computer readable medium comprising programming configured to instruct the rotating element 102 to rotate at a plurality of velocities, either instructed velocities 253, or compensation velocities 259. A plurality of differences (represented in FIG. 2C as the double-headed arrow) 257 are calculated by comparing the instructed velocities 253 and actual velocities 255. The controller further computes a plurality of compensation velocities 259 to correct the differences. Compensation velocities 259 may be based on the differences 257 or another suitable calculation, and the controller 104 instructs either the rotator 102 or propulsor 108 to turn at the compensation velocities 259 on the following rotation or rotations. The compensation velocities 259 can be thought of as error-correction for when the system 100 does not actually rotate at the idealized, instructed velocities. On additional revolutions, the system 100 continues to operate as described, sensor 106 measures and reports to the controller 104 the angular position and the feedback system 200 is repeated.

Another embodiment is depicted in FIG. 4B, where a single revolution SR is broken into 360 sections (depicted as Angular Position θ from 0 to 360). Angular positions from −60 to 0 and from 360 to 420 are also depicted in FIG. 4B but represent fractions of two additional single revolutions. Line 404 depicts the output from controller 104 of the instructed velocities 404. The instructed velocities 404 change in amplitude (plotted on the y-axis as angular velocity) as a function angular position. By increasing angular velocities gradually for a local maximum near section 0, depicted as +θ s, and reducing angular velocities gradually for a local minimum near section 180, depicted as −θs the controller affects an inter-revolution change in velocities to perform a behavior. In addition, compensation velocities 409 are depicted on FIG. 4B as a dashed-dotted line calculated by controller 104 to correct for a difference between actual velocities (not shown) and instructed velocities 404.

Figure 3:
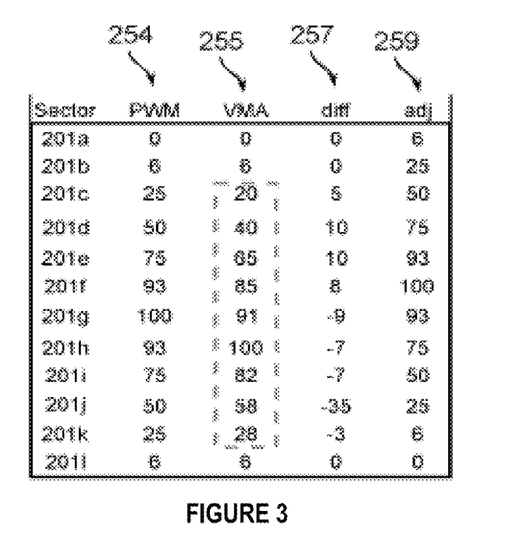
FIG. 3 is a representative table of actual speed values of a plurality of sectors according to one embodiment of the present invention, showing desired computed velocities (PWM), averaged actual velocities (VMA) and compensation velocities (adj)

The currently preferred embodiment measures and stores a plurality of velocity values for the plurality of sections. The plurality of stored measurements may be stored in a suitable data format (e.g. a table). As the rotator 102 rotates, sensor 106 records additional measurements, and these measurements are added to the plurality of stored measurements. Preferably, averages for the plurality of stored measurements for each section are calculated by the controller 104. Depicted in FIG. 3, a velocity moving average VMA is calculated for each of the 12 sections 251a-k. And the VMAs are updated with additional revolutions as additional actual velocities 255 are measured, as depicted in the third column of FIG. 3. The velocity moving average VMA is utilized to calculate the difference 257 (labelled as column 'diff' in FIG. 3) between the average VMA of actual velocities 255 and the instructed velocities 254 (labelled column 'PWM' in FIG. 3). The controller then computes the compensation velocities 259 based on the difference 257 and the instructed velocities, labelled as the adjusted values 'adj' column in FIG. 3. Note that in this case, the compensation velocities correct for the difference between instructed and actual velocities by essentially moving the instructed velocities of one section up to the preceding section. This re-assignment of instructed velocities from one revolution to the next as compensation velocities can be thought of as movement of the assigned, previous instructed velocities linked to a section to different sections of the next rotation.

In one embodiment, a single revolution SR is segmented into twelve sectors, and a running table of 1000 actual velocity values are stored for each sector, as the rotator 102 makes 1000 revolutions. The terms "running" and "moving" are used interchangeable herein to refer to a value set having values updated over time, with new values displacing the oldest values. The 1000 actual velocity values for each sector are averaged to produce velocity moving averages VMA for each sector. The VMA is updated for every revolution SR, older stored values are removed from storage, new values are added, and the moving average is recalculated at a set frequency. In addition, the difference and compensation velocities are also updated over time. The controller can replace the instructed velocities with the compensation velocities, and upon further revolutions, calculate new compensation velocities.

The number of stored values for each sector is customizable and may be any suitable number. In the currently preferred embodiment, 1000 stored values are stored for each section, in another embodiment the number of stored values for each sector is within the range of 100-10,000. In yet another embodiment, the number of stored values for each sector corresponds to the rotation speed (often in rpm) of the rotator 102 and increases or decreases as the rotator 102 speed changes.

Figure 2D:
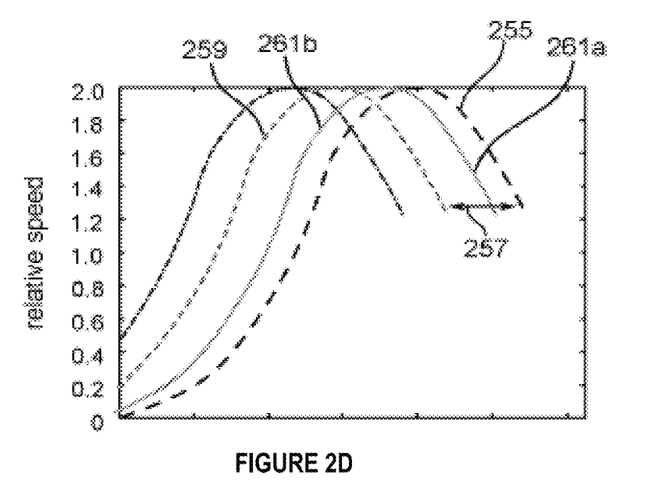

In some embodiments, the compensation velocities 259 are computed and the controller instructs the rotator 102 or propulsor 108 to execute the compensation velocities instantaneously. In other, more preferred embodiments, the controller gradually executes the totality of the compensation velocities 259 in smaller compensation fractions 261a, 261b of the full compensation velocity value over a plurality of revolutions, as depicted in FIG. 2D. The number or size of smaller compensation fractions 261 may be pre-defined or may be determined by the controller in real-time, depending on the magnitude of difference 257 between desired (instructed 254) and actual velocities 255.

In one embodiment, the controller executes the compensation velocities 259 as a series of compensation fractions 261 expressed as a frequency. For example, the controller 104 applies the compensation correction at 1000 Hertz (Hz), or over the period of 1000 revolutions of the rotating element, 1000 compensation fractions are applied. In other embodiments, the correction is applied as a function of rotating element speed. For example, if the rotating element 102 is rotating at 500 rpm, the compensation velocities/profile 259 is applied in 500 compensation fractions 261. If the rotating element 102 is sped up to 3000 rpm, the controller 104 applies the compensation velocities in 3000 compensation fractions 261 (i.e. 3000 Hz). In another embodiment, the compensation fraction number is inversely proportional to the speed of rotating element 102. For example, a baseline compensation fraction 261 of 500 Hz at rotating element 102 speed of 500 rpm would change to compensation fractions 261 of 100 Hz when the rotating element 102 is spun at 3000 rpm. In yet another embodiment, the number of compensation fractions 261 corresponds to the number of stored measurements of actual velocities 255 for each sector, either directly, or inversely. The present disclosure allows for the specific number or frequency of the compensation fractions 261 to be either pre-defined, adjustable in real-time, or controlled directly by the controller based on controller-based logic (i.e. programming).

The controller 104 is further programmed to simultaneously determine compensation velocities 259 or compensation fractions 261 as well as differences 257 on additional revolutions as the rotating element 102 continues to rotate and produce different amounts of error (i.e. difference 257). Therefore, the controller 104 is programmed to constantly determining new VMA and differences 257 values and constantly updating the compensation velocities 259 or fractions 261 needed to apply to the system for proper feedback control. Furthermore, as the system is utilized, the controller will either (1) execute new behaviors, requiring new instructed velocities 254 from a pre-defined program or (2) receive updated commands from an external control device 114, requiring new differences and compensation values.

The method for feedback system 200 may be executed by a computer that accesses or retrieves code stored in a non-transient computer readable medium of a computer program product.

Derivation for Control Parameters

The above described feedback system 200 may be advantageously implemented with simplified control parameters. The derivation and application techniques for these feedback control parameters for an embodiment will be detailed presently. For derivation, a coordinate frame must be established. The system coordinate frame conveniently follows the convention of x forward, y starboard (right side when oriented toward forward) and z down. The angular position θ (theta) of rotator 102 or actuator 112 (e.g. a propeller blade) is measured clockwise from the positive y-axis around the positive x-axis, as illustrated in FIG. 4A.

The force 618 of actuator 612 can be simplified by assigning it to a point 616 at radius 614 from the axis of rotation AR (here the x-axis). This simplification assumes that all the force 618 is imparted onto the surrounding environment at point 616. In practice, this distance 614 will increase with increasing velocities, depending on the actuator 612 shape. However, the increased distance 614 only increases the turning moment, so this assumption has little impact on the below control parameters.

With an established coordinate frame, the angular velocity of the actuator ω (omega) is controlled as a function of actuator angular position θ (theta). This function is a raised sinusoid and parameterized by three variables: (i) the nominal angular velocity $\omega_o$; (ii) the amplitude of the steering angular velocity sinusoid $\omega_s$; and (iii) the angle where the maximum steering amplitude occurs at $\theta_s$, and is expressed in Equation #3.

$$\omega(\theta) = \omega_O + \omega_S \cos(\theta - \theta_S) \qquad \text{Eq. #3}$$

The function defined in Equation #3 is constrained such that the velocity values are less than or equal to a maximum desired angular velocity, as described in Equation #4, and greater than zero as described in Equation #5, ensuring the actuator never comes to a rest during the rotation element's rotation. The preferred embodiments have these two constraints. However, in other embodiments, the rotating element is not constrained from coming to a rest, and Equations #4 and #5 are not employed.

$$\omega_O + \Omega_S \leq \omega_{max} \qquad \text{Eq. #4}$$

$$\omega_O - \omega_S > 0 \qquad \text{Eq. #5}$$

It is advantageous to describe the control parameters in terms that are directly proportional to the forces and moments that are generated by the system 100, which aids when designing a closed-loop feedback system 200 as described herein. To calculate thrust, moment, and power, the above equations are adapted with respect to time and angle. An assumption that $\theta_S$ is equal to 0 simplifies the computations significantly without loss of accuracy. The derivation obtains the goal of taking the control function (as a function of angular position) and convert it to a function of time over one revolution. Angular velocity is shown in Equation #6 as the change in angle with respect to time.

$$\omega = d\theta/dt \qquad \text{Eq. #6}$$

Rearranging the relationship allows for the computation of the definite integral over one full rotation SR to find the period of rotation T, as shown in Equation #7. A useful term $\omega_T$ emerges from Equation #7 that represents the time-average angular velocity and is shown in Equation #8.

$$T = \int_0^{2\pi} dt = \int_0^{2\pi} \frac{d\theta}{\omega(\theta)} = \frac{2\pi}{\sqrt{\omega_O^2 - \omega_S^2}} = \frac{2\pi}{\omega_T} \qquad \text{Eq. #7}$$

$$\omega_T = \sqrt{\omega_O^2 - \omega_S^2} \qquad \text{Eq. #8}$$

The term zero degrees steering is used herein to describe a constant angular velocity across all sections 251. At zero degrees steering (i.e. constant angular velocity) $\omega_S = 0$ and this is equivalent to the nominal velocity $\omega_O$ increases. As the steering amplitude $\omega_S$ increases, the period increases nonlinearly as the propeller blade (i.e. actuator 112) takes longer to transit the slower sectors of its revolution. In the currently preferred embodiments (where the rotation is not allowed to stop), the prohibited case is where $\omega_S = \omega_O$ and the period is infinite because the blade experiences zero velocity at its slowest point.

Taking the indefinite integral with respect to θ provides time as a function of angular blade 612 (i.e. actuator) position, as shown in Equation #9, and rearranging this equation provides the angular blade 612 position as a function of time, as shown in Equation #10.

$$t(\theta) = \int dt = \int \frac{d\theta}{\omega(\theta)} = \frac{2}{\omega_T}\tan^{-1}\left[\frac{\omega_T}{\omega_O + \omega_S}\tan\left(\frac{\theta}{2}\right)\right] \quad \text{Eq. #9}$$

$$\theta(t) = 2\tan^{-1}\left[\frac{\omega_O + \omega_S}{\omega_T}\tan\left(\frac{\omega_T t}{2}\right)\right] \quad \text{Eq. #10}$$

Taking the time derivative gives the angular blade velocity as a function of time, which is critical for the analysis of force, moment, and power, and is shown in Equation #11.

$$w(t) = \frac{d}{dt}\theta(t) = \frac{\omega_T^2}{\omega_O - \omega_S \cos(\omega_T t)} \quad \text{Eq. #11}$$

The instantaneous thrust force generated by the propeller 612 will be proportional to the square of the instantaneous velocity. An equation is obtained for the average force $\bar{F}$ over a full rotation by integrating this over one period and shown in Equation #12.

$$\bar{F} \propto \frac{1}{T}\int_0^T [\omega(t)]^2 dt = \omega_O \omega_T \quad \text{Eq. #12}$$

The moment generated is proportional to the force times the moment arm. For cases when θs is equal to 0, the moment arm is the projection onto the y-axis, or the cosine of θ(t). Similarly, integrating over one period obtains an equation (Equation #13) for the average moment $\bar{M}$ over one full revolution SR. This relationship enables the presently disclosed embodiment's ability to provide differential angular velocity and therefore, in this embodiment, the ability to maneuver (e.g. perform, complete and change behaviors).

Power is proportional to the cube of the velocity, and integration over one period to obtain a relation for the average power P over one full revolution SR and is given in Equation #14.

$$\bar{M} \propto \frac{1}{T}\int_0^T [\omega(t)]^2 \cdot \cos(\theta(t))dt = \frac{1}{2}\omega_S \omega_T \quad \text{Eq. #13}$$

$$\bar{P} \propto \frac{1}{T}\int_0^T [\omega(t)]^3 dt = \frac{1}{2}(\omega_S^2 + 2\omega_O^2)\omega_T \quad \text{Eq. #14}$$

Control Parameters. The angular velocities can be normalized with respect to some maximum angular velocity $\omega_{max}$, that may represent some physical limit of the system (e.g. rotating element or propulsor), as shown in Equations #15-17.

$$\tilde{\omega}_O = \frac{\omega_O}{\omega_{max}} \in [0, 1] \quad \text{Eq. #15}$$

$$\tilde{\omega}_S = \frac{\omega_S}{\omega_{max}} \in \left[0, \frac{1}{2}\right) \quad \text{Eq. #16}$$

$$\tilde{\omega}_T = \frac{\omega_T}{\omega_{max}} \in [0, 1] \quad \text{Eq. #17}$$

Note the open bounds on the maximum value of ½ for $\tilde{\omega}_S$ where the velocity function will go to zero. The dimensionless control parameters F and M that are directly proportional to the force and the moment derived above. This parameterization allows the thrust force and turning moment to be controlled independently and avoids the inherent coupling between $\omega_S$ and $\omega_O$, in an inter-rotation angular velocity system disclosed herein, and are defined as in Equations #18 and #19, respectively.

$$F = \tilde{\omega}_O \tilde{\omega}_T \in [0,1] \quad \text{Eq. #18}$$

$$M = \tilde{\omega}_S \tilde{\omega}_T \in [0, M^*] \quad \text{Eq. #19}$$

This parameterization allows the thrust force and turning moment to be controlled independently and avoids the inherent coupling between $\omega_O$ and $\omega_S$.

The maximum force neatly lies between 0 and 1 and the maximum value of the moment control parameter lies between 0 and some value M*. To determine this maximum value of the moment control parameter M*, first the angular velocities where the maximum moment occurs is found, which will occur somewhere along the maximum velocity condition line $\tilde{\omega}_O + \tilde{\omega}_S = 1$. (plotted as the heavy solid black line 502 in FIGS. 5A-6B). This value is entered into M, taking the derivative with respect to $\omega_S$ and setting it equal to zero to find the maxima, giving Equations #20 and #21.

$$\tilde{\omega}_O = 1 - \tilde{\omega}_s \rightarrow M = \tilde{\omega}_s\sqrt{\tilde{\omega}_0^2 - \tilde{\omega}_s^2} \quad \text{Eq. #20}$$

$$\frac{d}{d\tilde{\omega}_s}[\tilde{\omega}_s\sqrt{1 - 2\tilde{\omega}_s}] = 0 \quad \text{Eq. #21}$$

The maximum moment occurs at $\tilde{\omega}_O = \frac{2}{3}$, $\omega_S = \frac{1}{3}$ (plotted as solid circle 506 FIGS. 5A-6B), and that the maximum value the moment control parameter can take is given in Equation #22. Similarly, the force control parameter at this maximum moment is given in Equation #23.

$$M^* = \frac{1}{3\sqrt{3}} \approx 0.19 \quad \text{Eq. #22}$$

$$F^* = 2M^* \frac{2}{3\sqrt{3}} \approx 0.38 \quad \text{Eq. #23}$$

It is also interesting to note that there is a limit beyond which increasing $\omega_S$ for the same $\omega_O$ decreases the moment. This can be found by taking the derivative of M with respect to $\omega_S$ and seeing it equal to zero, show in Equation #23b, which yields the line described by Equation #23c.

$$\frac{d}{d\tilde{\omega}_s}M = 0 \quad \text{Eq. #23b}$$

$$\tilde{\omega}_s \vDash \sqrt{2}\,\tilde{\omega}_s \quad \text{Eq. #23c}$$

Control parameters R and E are analogous to the conventional elevator (E) and rudder (R) angles, each lying neatly within a range of −1 to 1 and can be defined as in Equations #24 & #25, respectively.

$$R \in [-1,1] \quad \text{Eq. #24}$$

$$E \in [-1,1] \quad \text{Eq. #25}$$

This is an acceptable analog since the lift from a thin symmetric foil at small angles of attack is roughly linear. The terms are defined naturally in the coordinate system such that positive R induces a positive (starboard) yaw moment and positive E induces a positive (upward) pitch moment. Since these are orthogonal moments, they can be related to the moment control parameter via a Pythagorean relationship, as shown in Equation #26.

$$M = \frac{\sqrt{R^2 + E^2}}{3\sqrt{6}} \qquad \text{Eq. #26}$$

The scaling in the denominator includes two factors: the first factor $$\frac{1}{3\sqrt{3}}$$

from M* and a $$\frac{1}{\sqrt{2}}$$

term ensuring that the maximum moment commanded when R=1 and E=1 still equals M*. In this way, any combination of R and E in the domain of [−1, 1] can be used to obtain a valid moment control parameter. The scaling ensures that the range of M is preserved in the transformation. The steering angle, up until this point assumed to be zero, can be determined with a four-quadrant arctangent, defined in Equation #27.

$$\theta_S = \tan^{-1}\left(-\frac{R}{E}\right) \in [-\pi, \pi] \qquad \text{Eq. #27}$$

Finally, the angular velocities parameterizing the velocity function can be computed as shown in Equations #28 and #29, using the relationship defined in Equation #30. The domain spaces of the angular velocities and the dimensionless control parameters, with relevant quantities are illustrated in FIGS. 5A-6B.

$$\tilde{\omega}_O = \frac{F}{\tilde{\omega}_T}\tilde{\omega}_{max} \qquad \text{Eq. #28}$$

$$\tilde{\omega}_S = \frac{M}{\tilde{\omega}_T}\tilde{\omega}_{max} \qquad \text{Eq. #29}$$

$$\tilde{\omega}_T = \sqrt{F^2 - M^2} \qquad \text{Eq. #30}$$

The final goal is to establish a simple pipeline by which the control parameters can be converted into the parameters of the velocity function without violating the range constraints. FIGS. 5A-6B illustrate the domain spaces of the feedback system 200 and highlights one possible pair of domains that is easy to check for out-of-range values; where the domain spaces of the dimensionless control parameters and the angular velocities are mapped to each other on the graph.

In some embodiments, determining the validity of a given command values from the outside controller is computationally intensive. Therefore, the shaded region 510 in FIGS. 5B and 6B may be established to further limit the domain of commands deemed valid by the controller 104. Commands within these regions may be easily checked for out-of-range values. In this embodiment, forces greater than F>F* and moments greater than M>½F are not allowed. When a commanded force is greater than F*, the force at the maximum moment, it should be clipped (i.e. reduced) to F*. When a moment larger than ½F is commanded, it should be clipped as well, to ½F, thus limited to shaded region 510. This scheme limits the speed to that where a system 100 (e.g. an underwater vehicle) is most maneuverable and limits the moment at lower speeds where it is less maneuverable.

Figure 7:
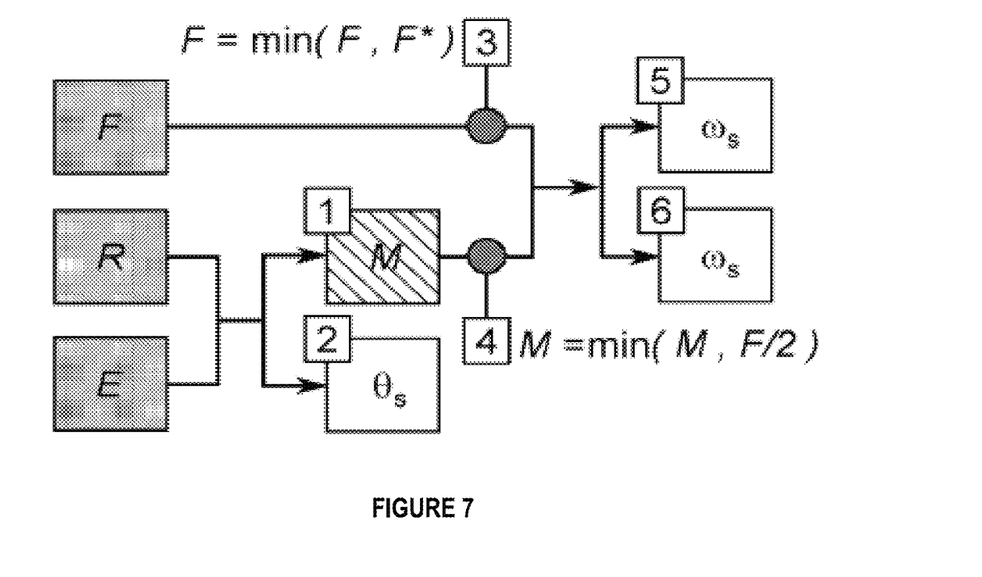
FIG. 7 schematically illustrates one control pipeline for computing velocity function parameters from control parameters.

FIG. 7 illustrates one possible implementation of the above scheme outlined as a pipeline for computing velocity function parameters (clear boxes) from the control parameters (gray shaded boxes) with checks to correct (clip) out of range values (gray circles).

Moment and Steering Angle. The Cartesian coordinates of the Rudder R and Elevator E are effectively converted into the Polar coordinates of the Moment M and Steering Angle $\theta_S$. The moment is computed as before using the appropriate scaling and is shown in Equation #31. And the steering angle $\theta_S$ (up until this point assumed to be zero) can be determined with a four-quadrant arctangent as shown in Equation #32, where checks should occur for the cases where the argument is 0 or 1/0.

$$M = \frac{\sqrt{R^2 + E^2}}{3\sqrt{6}} \in \left[0, \frac{1}{3\sqrt{3}}\right] \qquad \text{Eq. #31}$$

$$\theta_S = \tan^{-1}\left(-\frac{E}{R}\right) \in [-\pi, \pi] \qquad \text{Eq. #32}$$

Velocity Function parameters. Finally, the angular velocities parameterizing the velocity function can be computed. These terms have been rearranged to make them more stable to compute and are shown in Equations #33 and 34.

$$\frac{\omega_O}{\omega_{max}} = \sqrt{\frac{F}{\sqrt{1 - M^2/F^2}}} \in \left[0, \frac{2}{3}\right] \qquad \text{Eq. #33}$$

$$\frac{\omega_S}{\omega_{max}} = \sqrt{\frac{M}{\sqrt{F^2/M^2 - 1}}} \in \left[0, \frac{1}{3}\right] \qquad \text{Eq. #34}$$

Example 1

One specific embodiment within the scope of the invention will be presently described. In this embodiment, the controller utilizes a proportional-integral-derivative (PID) controller feedback system 200 to provide continuous modulated control of the rotating element's plurality of angular velocities. This control system 200 and controller hardware is referred to together as the PID controller. The PID controller continuously receives positional information from the sensor, referred as a measured process variable PV, and compares the positional information with the desired set point to produce an error value e(t). The PID controller then applies compensation velocities based on proportional P, integral I and derivative D control terms.

The PID controller applies these three control terms simultaneously, enabling automatic application of accurate and responsive correction. The proportional P term is proportional to the error value e(t) term, times a gain factor K term. The proportional P term contains error and is used to generate a proportional response, this proportional P term inherently has additional error when used in compensation.

The integral I term accounts for error values e(t) from previous control iterations (i.e. past values) and integrates the past values over time to produce the integral I control term. Finally, the derivative D control term is an optimized estimate of future error values e(t) based on the rate of change of the error values. Each control term further comprises a constant K (Kr Ki KD, for proportional, integral and derivative, respectively).

Example 2

A second specific embodiment is discussed currently herein and illustrated in FIGS. 4A-4C. An asymmetric propeller blade 612 is rotated by a rotator 102 (along longitudinal axis x) and propulsor 108 (not shown) through a plane defined by the z and y dimensions as shown in FIG. 4A. All possible positions along this rotation are described as angular positions θ and are plotted in Cartesian space in FIG. 4B and in polar space in FIG. 4C. In FIG. 4C, angular position θ is labelled around the exterior of the circle plot in degrees (0 to 360 degrees), corresponding to the x-axis of FIG. 4B; and the amplitude of angular velocity ω is plotted as concentric circles ranging and labelled from 0 to 1.0, corresponding to the y-axis of FIG. 4B. The angular velocity ω of propeller 612 moves the propeller through the rotation. A constant, nominal angular velocity wo is shown as a grey dotted line in FIGS. 4B and 4C and can be thought of as the standard operation of known rotating elements. This velocity would impart a constant moment M onto the surrounding medium (in this embodiment a body of liquid), propelling the attached vehicle 600 forward, generally along axis x.

Changing the angular velocity over a portion of a revolution SR (i.e. at a plurality of sections, but not all sections) produces a steering velocity $\omega_S$ and a sinusoidal velocity profile of the plurality of velocities. As shown as a function of angular velocity ω, on a first single revolution SR, the propeller 612 is speed up to a maximum at about θ of 0 degrees to the steering velocity $+\omega_S$ and slowed down at to a minimum at about 0 of 180 degrees to the steering velocity $-\omega_S$ (FIGS. 4B and 4C). Repeated over many revolutions, this velocity profile imparts uneven moment to the surrounding environment and turns vehicle 600 with respect to the surrounding medium.

Figure 5A:
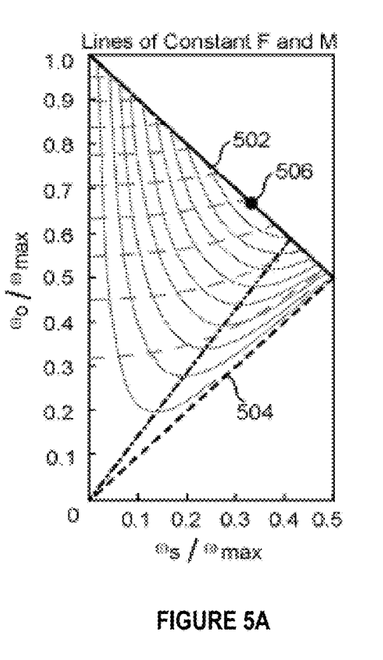
FIGS. 5A and 5B are angular velocity and angular position plotted against steering angular velocity over maximum angular velocity and nominal angular velocity over maximum angular velocity, according to one embodiment.
Figure 5B:
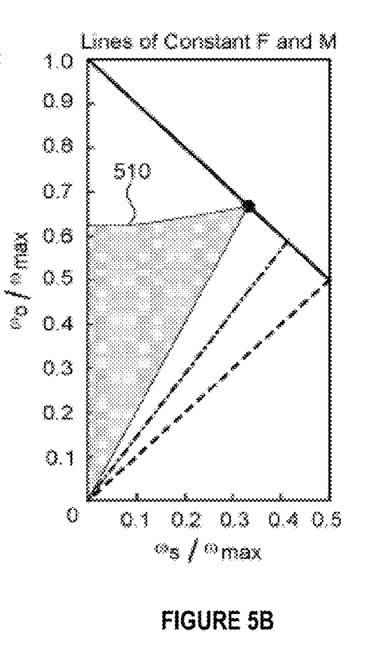

The domain space of the above control parameters, nominal angular velocity, steering velocity, and angular position can be plotted as a function of each velocity over its maximum velocity, as shown in FIGS. 5A and 5B. Valid values are constrained within the space defined by solid black line 502 representing the function of $\omega_O+\omega_S=1$ and dashed black line 504 representing the function of $\omega_O+\omega_S=0$. Valid values are constrained between solid black line 502 and dashed black line 504 due to the imposed constraints described in Equations #4 and #5. Without these constraints, a valid command would allow the rotating element 102 to stop rotating (velocity=0), which is detrimental to this particular embodiment. It is within the scope of the invention to remove these constraints for some embodiments. Lines of constant force are depicted as dashed grey lines and lines of constant moment are depicted as solid gray lines.

Figure 6A:
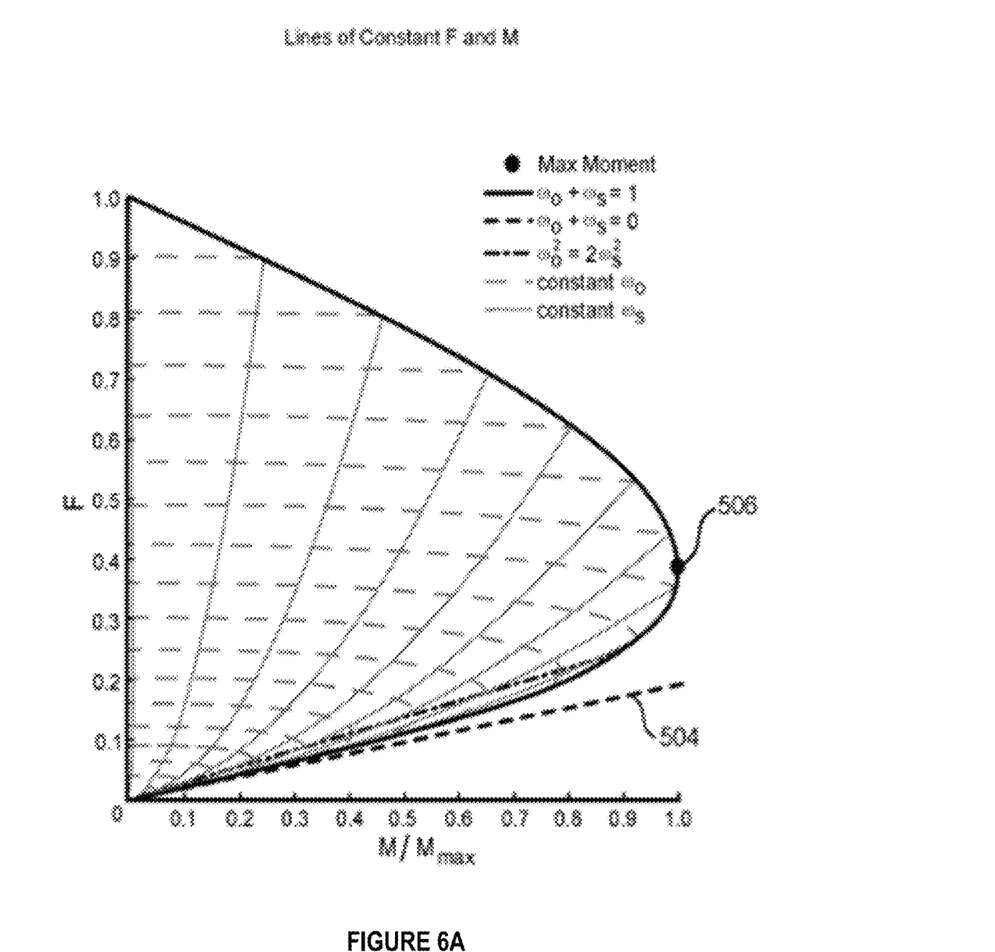
FIGS. 6A and 6B represents the data from FIGS. 5A and 5B converted into Force and Moment coordinate space.
Figure 6B:
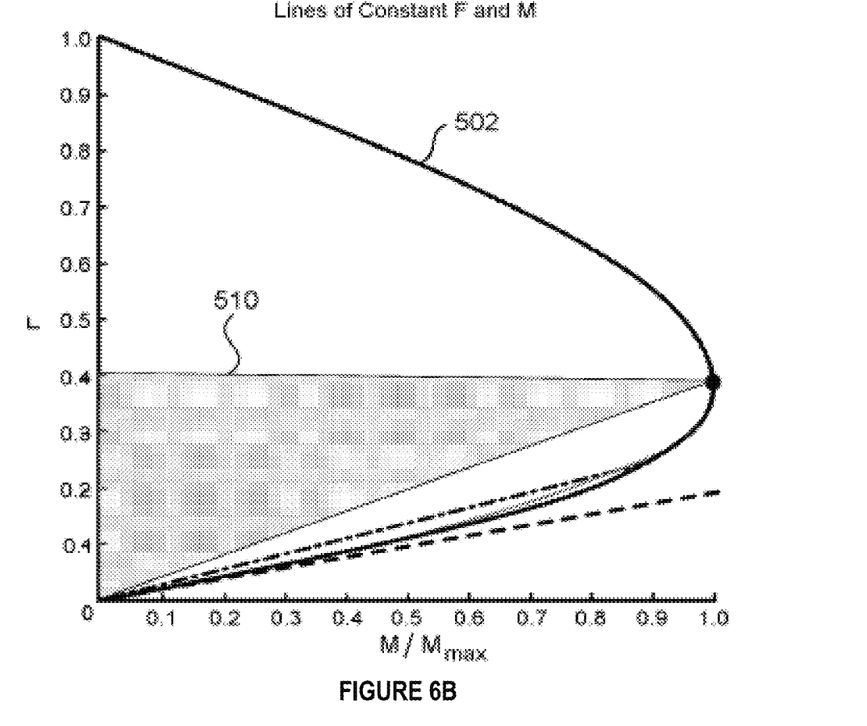

Using the calculations disclosed in the Derivation for Control Parameters section above, the domain can be converted into an easily processed domain space of Force and Moment, as illustrated in FIGS. 6A and 6B. In this domain, valid values are constrained with in the space defined solely by solid black line 502 representing $\omega_O+\omega_S=1$. With lines of constant $\omega_O$ are depicted as dashed grey lines and lines of constant $\omega_S$ are depicted as solid gray lines.

This domain space allows for acceptance of thruster (force) and elevator and rudder (moment) commands from an attached vehicle 600 to the inventive system 100. The system 100 then translates these universally accepted terms into control parameters to execute on the rotating element 102 or propulsor 108.

The speed of the rotating element 102 is variable, and most often unique to a particular embodiment. However, there are typical rotating element speeds for some embodiments, for example an underwater vehicle embodiment with a 13 inch diameter operates within a range of up to about 800 rpm, an underwater vehicle embodiment with a 7.5 inch diameter operates within a range of up to about 2,000 rpm, and an underwater vehicle embodiment with a 3 inch diameter operates within a range of up to about 3,000 rpm.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A rotational controlling system, comprising:
a controller;
a rotating element having an axis of rotation, and configured to rotate about said axis of rotation; and
a sensor configured to determine angular positional information of said rotating element;
wherein said controller receives said angular positional information from said sensor and is configured to control the angular velocity of said rotating element within a single revolution of said rotating element.

2. The system of claim 1 further comprising a propulsor connected to said rotating element and configured to provide a force to rotate said rotating element.

3. The system of claim 1, wherein said controller utilizes a proportional-integral-derivative controller feedback mechanism.

4. The system of claim 1, wherein said controller establishes a plurality of sections representing a single revolution of said rotating element.

5. The system of claim 4, wherein said sensor determines angular positional information for each section of said plurality of sections, said controller stores a plurality of angular positional information for each section of said plurality of sections, and said controller averages said plurality of angular positional information for each section of said plurality of sections.

6. The system of claim 1 further comprising a housing having an interior and configured to exclude the external environment; wherein said controller is located within the housing interior.

7. The system of claim 1 further comprising an external control device connected to said controller and said external control device configured to provide control instructions to said controller.

8. A rotational control system, comprising:
   a rotating element having an axis of rotation;
   a controller; and
   a propulsor connected to said rotating element and configured to produce a motive force that rotates said rotating element about said axis of rotation;
   wherein said controller is connected to said propulsor and is configured to change the motive force of said propulsor by calculating a first and a second control parameter.

9. The system of claim 8, wherein said first control parameter is steering angular velocity $\omega_s$ and said second control parameter is angular position $\theta$.

10. The system of claim 9 further comprising a third control parameter of nominal angular velocity $\omega_o$.

11. The system of claim 10, wherein said third control parameter and said first control parameter combined are less than a fourth control parameter of the maximum angular velocity $\omega_{max}$.

12. The system of claim 10, wherein said third control parameter subtracted from said first control parameter is greater than zero.

13. The system of claim 10, wherein said third control parameter subtracted from the absolute value of said first control parameter is greater than zero.

14. The system of claim 8, wherein said controller changes the motive force of said propulsor with an inter-rotation velocity profile comprising a plurality of angular velocities within a single revolution of said rotating element.

15. The system of claim 14, wherein said controller repeats said inter-rotation velocity profile over a plurality of revolutions of said rotating element.

16. A non-transient computer readable medium containing program instructions for causing a computer to perform the method of:
   (a) setting a plurality of instructed velocities to control a rotational element's angular velocity within a single revolution of said rotational element;
   (b) instructing said rotational element to rotate according to said plurality of instructed velocities;
   (c) receiving, from a sensor, actual velocities of said rotational element;
   (d) computing a plurality of compensation velocities based on said plurality of instructed velocities and said plurality of actual velocities; and
   (e) instructing said rotational element to rotate according to said plurality of compensation velocities.

17. The non-transient computer readable medium of claim 16 further including the steps of:
   (f) establishing a plurality of sections, said plurality of sections representing one revolution of said rotating element;
   (g) assigning to each section of said plurality of sections one of said plurality of instructed velocities, producing a plurality of assigned velocities; and
   (h) assigning to each section of said plurality of sections one of said plurality of compensation velocities;
   wherein step (g) occurs before step (b) and step (h) occurs before step (e).

18. The non-transient computer readable medium of claim 17, wherein said plurality of compensation velocities are further computed by moving said assigned velocities from one section to another of said plurality of sections.

19. The non-transient computer readable medium of claim 16, wherein said plurality of compensation velocities are computed by calculating a plurality of differences between said plurality of instructed velocities and said plurality of actual velocities.

20. The non-transient computer readable medium of claim 16 further including the step of (i) rotating said rotational element by a propulsor, said propulsor providing a motive force to rotate said rotating element, and wherein said plurality of instructed velocities and said plurality of compensation velocities are applied to said propulsor.

* * * * *